Figure 12:
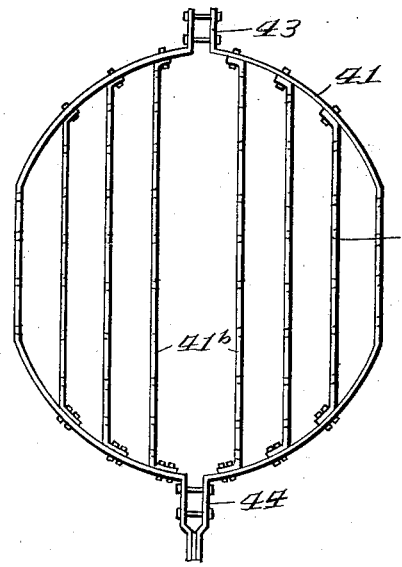

No. 609,609. Patented Aug. 23, 1898.
C. W. DAVIS.
CULTIVATOR.
(Application filed Feb. 10, 1897.)
(No Model.) 5 Sheets—Sheet 1.
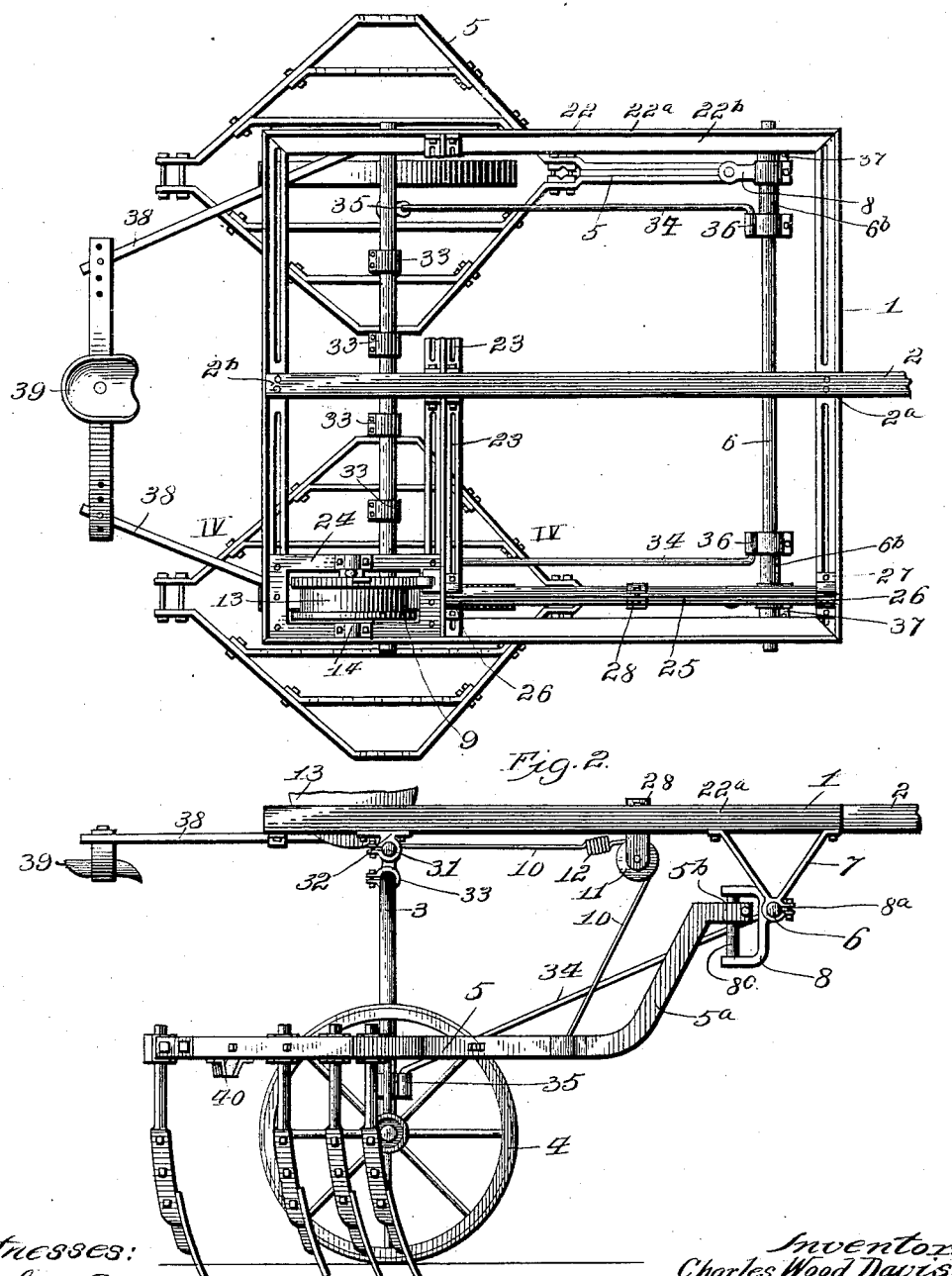
Witnesses:
Herbert Bradley
Fred R. Proctor
Inventor:
Charles Wood Davis.
By Knight Bros
Atty's No. 609,609. Patented Aug. 23, 1898.
C. W. DAVIS.
CULTIVATOR.
(Application filed Feb. 10, 1897.)
(No Model.) 5 Sheets—Sheet 2.
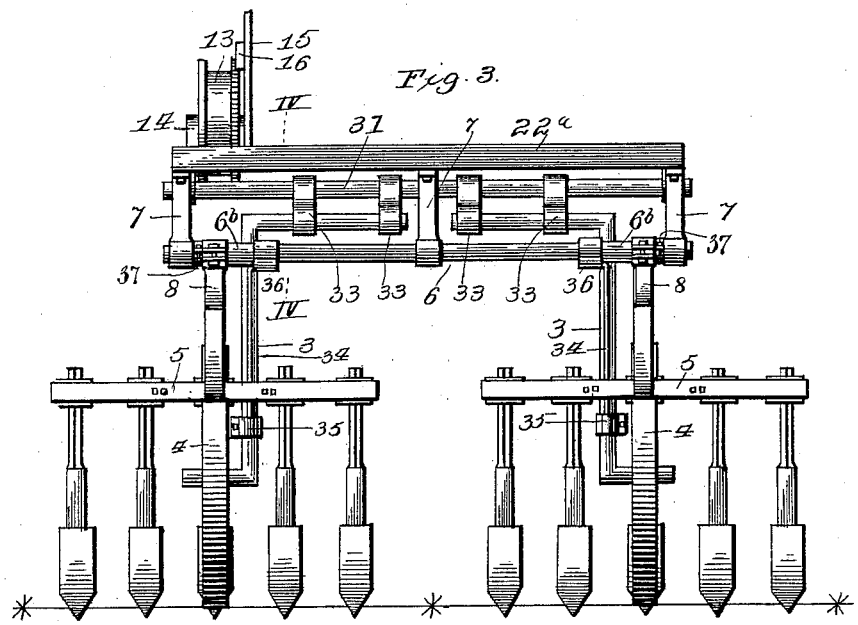
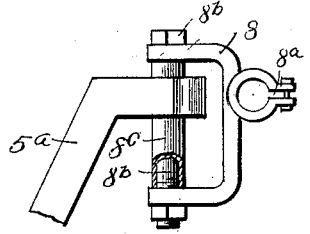
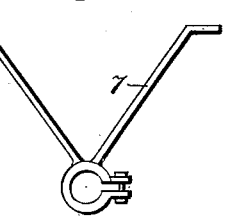
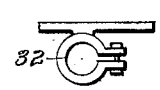
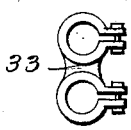
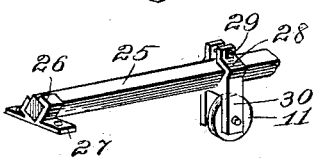
Witnesses:
Herbert Bradley
Fred R. Proctor
Inventor
Charles Wood Davis.
By Knight Bros
Attys
THE NORRIS PETERS CO., PHOTO-LITHO., WASHINGTON, D. C.

No. 609,609. Patented Aug. 23, 1898.
C. W. DAVIS.
CULTIVATOR.
(Application filed Feb. 10, 1897.)
(No Model.) 5 Sheets—Sheet 3.

Witnesses:
Herbert Bradley
Fred R Proctor

Inventor
Charles Wood Davis.
By Knight Bros
Attys

No. 609,609. Patented Aug. 23, 1898.
C. W. DAVIS.
CULTIVATOR.
(Application filed Feb. 10, 1897.)
(No Model.) 5 Sheets—Sheet 4.
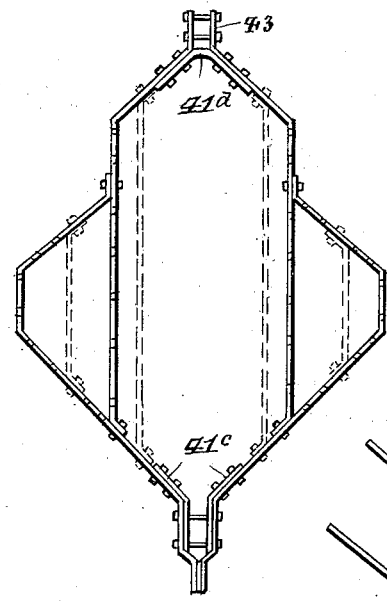
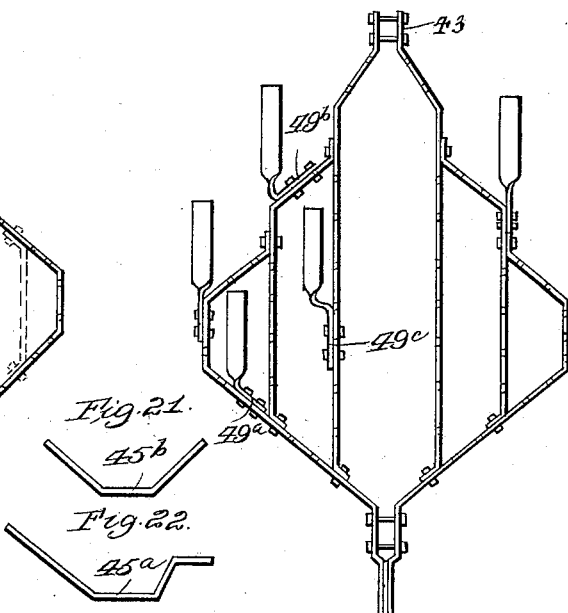
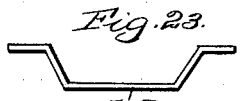
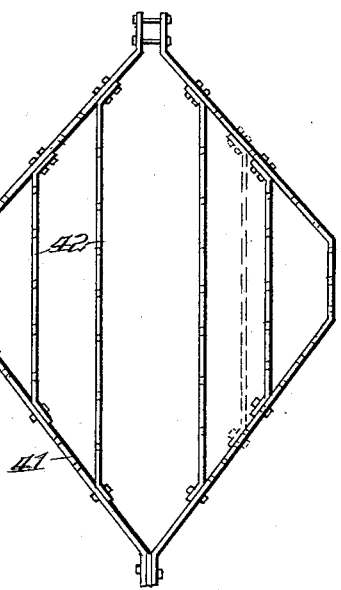
Witnesses:
Herbert Bradley
Fred R. Proctor
Inventor
Charles Wood Davis
By Knight Bros
Atty's.

No. 609,609. Patented Aug. 23, 1898.
C. W. DAVIS.
CULTIVATOR.
(Application filed Feb. 10, 1897.)
(No Model.) 5 Sheets—Sheet 5.
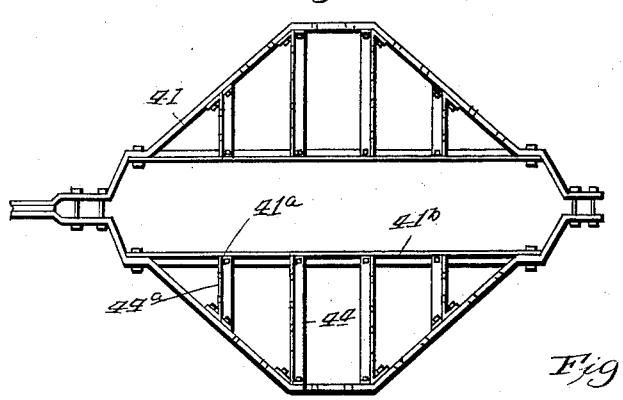
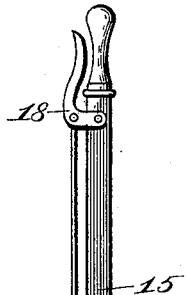
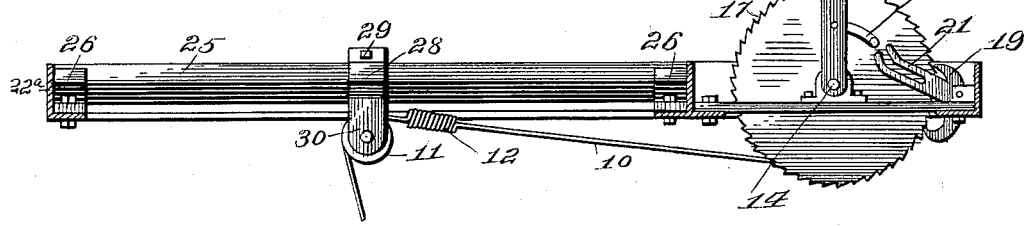
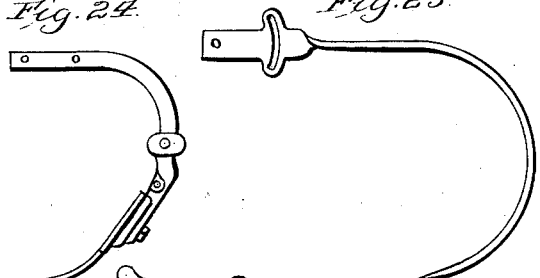
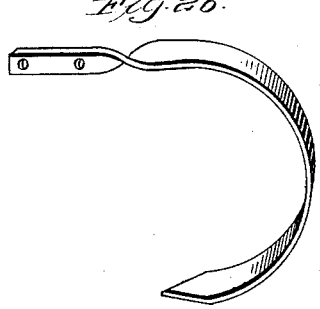
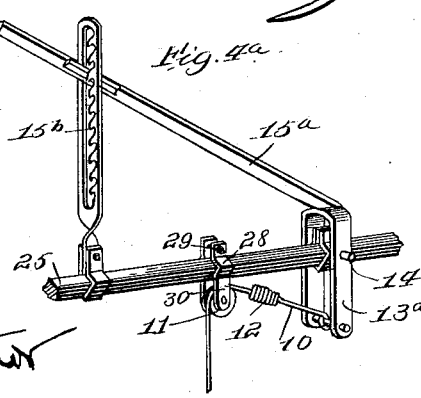
Witnesses:
Herbert Bradley
Fred R. Proctor
Inventor
Charles Wood Davis.
By Knight Bros
Atty's.

UNITED STATES PATENT OFFICE.

CHARLES WOOD DAVIS, OF NEAR PEOTONE, KANSAS.

CULTIVATOR.

SPECIFICATION forming part of Letters Patent No. 609,609, dated August 23, 1898.

Application filed February 10, 1897. Serial No. 622,807. (No model.)

*To all whom it may concern:*

Be it known that I, CHARLES WOOD DAVIS, a citizen of the United States, residing near Peotone, Viola township, Sedgwick county, in the State of Kansas, have invented certain new and useful Improvements in Cultivators and other Soil-Stirring Implements, of which the following is a specification.

My invention relates to features of construction applicable for the most part to either double-row cultivators or to those implements intended to cover the entire ground, as in case of fallow-working.

One object of my invention is to provide machines to which may be applied two or more gang-frames at will, laterally adjustable and arranged so that an intermediate frame may be omitted for double-row cultivating or applied so as to cover the entire ground, or in which two frames may be moved up close together to cover all of the ground or spread apart at will.

A further object is to provide suitable elevating mechanism which will take any desired portion of the weight off the gang-frames or lift them entirely and which in case of riding-cultivators is adjustable, so as to adapt the elevating mechanism to balance the weight of the rider.

A further object is to make gang-frames adjustable when they surround the wheel of the implement, and thereby add greatly to the utility of the implement.

A further object is to improve the forms of frames now in use in cultivators and to improve certain forms of teeth which are adapted to said frames.

Further objects are to improve the various details of construction, whereby simplicity and durability are obtained and efficiency of the machine is increased, coupled with the saving of labor.

My invention consists in features of novelty hereinafter fully described, and particularly pointed out in the claims.

Figure 13:
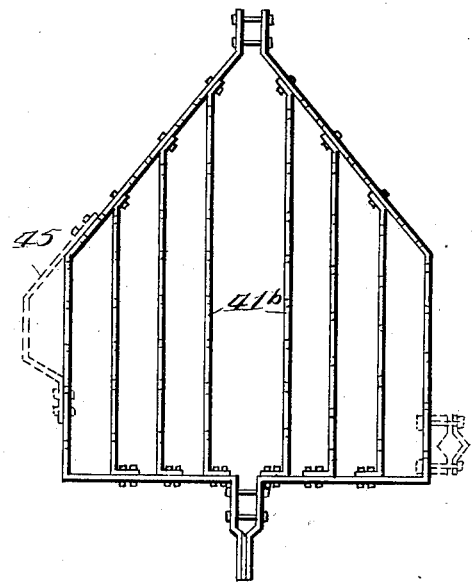
Figure 14:
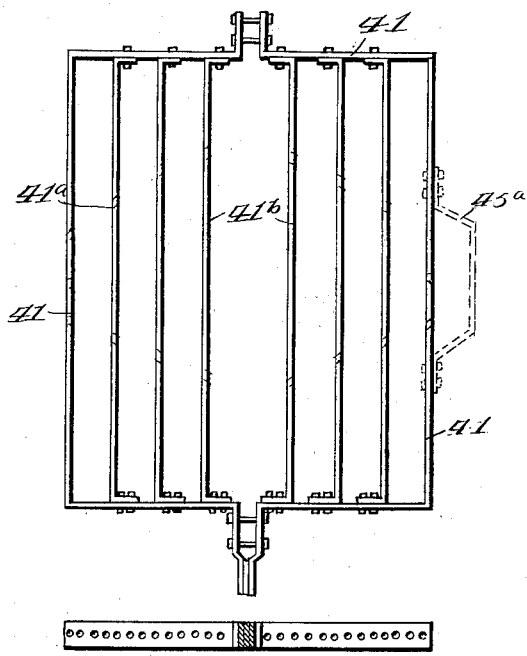
Figure 15:
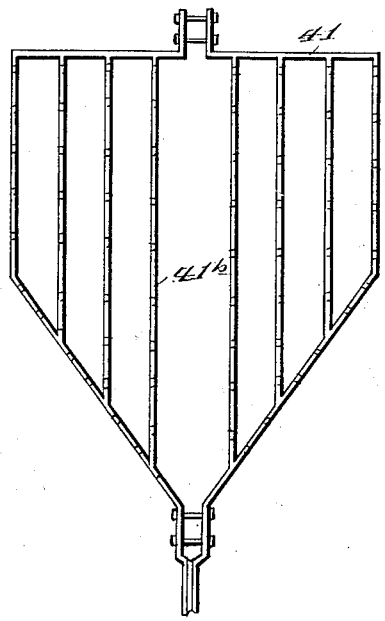

In the accompanying drawings, Figures 1, 2, and 3 are respectively a plan, a side elevation, and a front view of an implement constructed in accordance with my invention, but intended as a riding double-row cultivator. Fig. 4 is an enlarged detail view of one of the elevating and spring-supporting mechanisms for the gang-frames, the section being taken on the line IV IV, Figs. 1 and 3; and Fig. 4ᵃ is a modification. Figs. 5 and 6 are detail views of one of the stirrups and a bifurcated connecting part by which the draft-bars are connected to the draw-head. Fig. 7 is a detail view of one of the brackets by which the draw-head is mounted beneath the frame of the machine. Figs. 8, 9, and 10 are detail views of collars employed for mounting different parts of the machine, as will hereinafter be referred to. Fig. 11 is a detail view of the adjustable pulley which receives the flexible elevating connection and the mounting for said pulley. Figs. 12 to 20 are views illustrating different forms of gang-frames. Figs. 21, 22, and 23 represent extensions which may be applied to the gang-frames above referred to, as well as to other gang-frames shown in other applications which I have filed, for enlarging the scope of the implement. Figs. 24, 25, and 26 represent different special forms of teeth which, in addition to ordinary forms, are applicable to my improved form of cultivator.

My improved implement comprises a main frame 1, adapted to be drawn by a tongue 2 and supported by an arch 3, carrying wheels 4, and having a draw-head 6, secured thereto by brackets 7, which draw-head 6 extends across the main frame and receives two or more gang-frames either to cover the whole or a part of the ground, gang-frames 5 surrounding the wheels and having adjustable draft connections with the frame 1 through laterally-shiftable stirrups 8 on a draw-head 6, which is secured by brackets 7 to the main frame. The stirrups 8 are such as to adapt the gang-frames to be elevated or laterally deflected at will for passing around certain points in addition to the lateral shifting upon the draw-head 6, which adapts the implement to be set for different widths of row-spaces, and elevating mechanisms 9, connected with the gang-frames 5 by flexible connections 10, passing over the guide 11 and having interposed springs 12.

The elevating mechanism comprises a winding-drum 13, journaled at 14 and controlled by a lever 15, fulcrumed on the turning center of the drum and having a pawl 16, which engages a ratchet 17, formed on one of the flanges of the winding-drum and controlled by trip-lever 18, located adjacent to the handle of lever 15, the drum being held to adjustment by a suitable dog 19, preferably in the form of an escapement, in order that tension on the flexible connection 10 may be let off at will. To provide means in connection in order that the winding and unwinding may be accomplished by a single device, I employ projection 20 on said lever and a bifurcated rock-arm 21, integral with the escapement-dog 19. By this means the lever 15 is free for use in winding the drum by a backward-and-forward movement within certain limits, or when said lever is moved backward until the projection 20 enters the bifurcated rock-arm 21 it may then be oscillated in short strokes to vibrate the escapement-ratchet 19, with the obvious effect of permitting the winding-drum 13 to yield to the tension of the flexible connection 10. Substantially the same effect may be produced by the lever 15$^a$, fulcrumed at 14$^a$ and having its short end 13$^a$ connected with the flexible connection 10 and spring 12, as shown in Fig. 4$^a$, said lever being held to adjustment by common form of rack 15$^b$.

The spring 12 performs an important function, inasmuch as it has sufficient strength to lift the gang-frame without exceeding the limit of its elasticity, and I am therefore enabled to either raise the gang-frame by winding the cord until the spring has stretched and the frame moves upward, or by stretching the spring to any extent less than sufficient to lift the gang-frame I may apply any desired tension to the flexible connection 10, and consequently remove from the shovels any desired portion of the weight of the gang-frame and the attached shanks and shovels. In this way I may regulate to a nicety the penetration of the shovels or other soil-stirring parts constituting parts of the implement.

The main frame of the implement preferably comprises a continuous rigid rim 22 of angle-iron, with the vertical flange 22$^a$ projecting upward on the outer edge and a horizontal flange 22$^b$ projecting inward and forming a seat upon which other parts may be mounted or from which they may be suspended. This vertical flange 22$^a$ is preferably cut away in front sufficiently to receive the tongue 2, as shown at 2$^a$, while the rear end 2$^b$ of said tongue preferably abuts against the vertical flange of the rear side. The tongue is secured by bolts, as shown at 2$^a$ and 2$^b$. In mounting the elevating and tension mechanism I preferably employ inverted-T irons 23, extending transversely from the sides of the frame to the tongue, and drum-frames 24, bridging the spaces between the T-irons 23 and the back end of the main frame 1. To mount the pulleys 11, I employ rectangular bars 25, arranged cornerwise, ar shown, and having their ends secured in sockets 26, having flanges 27, (see Fig. 11,) and secured to the main frame through the medium of slots adjustably engaging bolts, as shown in Fig. 1. The pulley 11 has a correspondingly-formed clamp-socket 28, Fig. 11, which embraces the rod 25 and is clamped thereon by bolt 29 and has a hanger 30, in which the pulley is journaled. The clamp-socket 28 permits adjustment of the pulley backward and forward, and thus, with a change in the place of attaching the flexible connection to the gang-frame, provides for shifting the load on the main frame 1 and permits balancing of the weights of different drivers. As the gang-frames are shiftable laterally, so the winding-drum and pulley of the elevating mechanism are adjustable laterally, and for this reason they are secured by bolts and slots, as shown.

31 represents an arch-bar secured by clamp-brackets 32 to the under side of the flange 22$^b$ of the main frame, and from this arch-bar 31 the divided arch 3 is suspended by twin collars 33. The arch is divided centrally, and the twin collars 33 are adjustable relatively to the arch-bar 31 or to the divided arch 3, or both, for permitting lateral adjustment of the arch, together with the parts which it carries, to make it wider or narrower, and thereby adapting it to different widths of row-spaces.

34 represents brace-rods each having one end bent downward and pivoted into a socket-collar 35, adjustably clamped on the lower part of the vertical arm of the arch, while its upper end passes horizontally and is pivoted into a socket-collar 36, adjustably clamped upon the draw-head 6, as shown in Figs. 1 and 2. By this means each part of the divided arch 3 is held securely in a vertical position and all strain from the dragging of wheels 4 is transmitted directly to the draw-head 6, and said braces are both pivotally and adjustably secured to the arms of the arch and to the draw-head by means of clamping-collars 35 and 36.

Each stirrup 8 has a clamp 8$^a$, by which it is fixed on a sleeve 6$^b$, surrounding draw-head 6, which said sleeve turns freely upon said draw-head to permit lifting of the gang-frame, but abuts laterally against the movable socket-collar 36 and a movable collar 37 to confine said sleeve at any point on the draw-head to which said clamp and collar may be adjusted. The draw-bar 5$^a$ of the gang-frame 5 is secured by a bifurcated connecting part 5$^b$, which engages the sleeve 8$^c$ on the bolt 8$^b$ of the stirrup 8, and thereby leaves the gang-frame free for lateral deflection, said bifurcated part being, as shown in Fig. 6, clamped by a bolt 5$^c$ upon the sleeve 8$^c$ and permiting vertical adjustment of the forward end of said draw-bar, while not impairing the turning connections on the bolt 8$^b$.

38 represents arms from which may be suspended a hammock-seat or other suitable form of seat 39.

40 represents stirrups on the gang-frames for the feet of the operator, and by means of which he can deflect the gang-frames laterally within certain limits to pass around obstructions or plants which are out of line.

By shifting the socket-collars 36 and the movable abutting collars 37 the sleeves upon which are mounted the stirrups 8 may be shifted at will upon the draw-head 6 and set to any new position, and the gang-frames thereby fixed at a greater or less distance apart. In a like manner the wheels 4 may be shifted correspondingly by adjusting the parts of the divided arch on the arch-bar 31. The implement is thereby adapted for cultivating entire row-spaces of greater or less width. Moreover, as will hereinafter appear, I provide lateral extensions which may be employed for extending the scope of the implement laterally either for covering wider row-spaces or for stirring the whole of given portions of the ground, as may be desirable in working fallows, stubbles, and orchards, and in broadcast seeding.

While I prefer to employ certain forms of gang-frames in connection with the features of my invention thus far described, it is obvious that such previously-described features are not limited in their use to any particular form of gang-frames. I may also employ either the straight shank or the curved shank for attaching shovels, teeth, or other soil-stirring parts, or even spring-teeth, and the forms of gang-frames which I shall describe are well adapted for the attachment or interchange of either of such forms of shovels, teeth, or other soil-stirring parts. I shall also describe some new gang-frames which I may use.

The gang-frames as I construct them preferably comprise a rigid and substantially continuous border 41 and intermediate bars 42, bolted to the border in such a manner as to be removable, interchangeable, or shiftable, and longitudinal fixed bars $41^b$, leaving at all times a central well for the wheel and of such width and length as to permit lateral deflection and vertical swinging of the gang-frame. The border is preferably divided into at least two parts, connected together at front or rear, or at both front and rear, of the middle line in such a manner as to form socket-clamps 43, adapted to receive the middle teeth. This construction also adapts the frames for convenient attachment to the draw-bars, as the ends of said draw-bars may be easily clamped between the parts or may be extensions of the border. In the event of its being desired to increase the width of the frames this may be done by extensions 45, $45^a$, or $45^b$, as shown detached in Figs. 21, 22, and 23 and applied to the frames in Figs. 13, 14, and 19, the extensions being designed for application to differently-formed frames or parts of frames, secured thereto by means permitting ready removal as well as attachment.

It is often desirable in cultivating land that the soil-stirring devices be arranged in diagonal lines rather than staggered, so that the soil stirred by one will not be again stirred by a succeeding shovel and the weeds turned under thereby uncovered. For this reason it is desirable to have the intermediate bars shiftable or adjustable. This is accomplished in the form or frame shown in Fig. 14 by simply having an excess of bolt-holes, so that some of the bars may be removed and the remaining ones adjusted to symmetrical positions. To accomplish this in the forms of frames having curved or angular sides, it is preferable to employ interchangeable bars which will fit at different points.

As shown in Fig. 16, the front and rear angles, and others, if desirable, may be braced by reinforcing-pieces $41^c$ $41^d$. The braces $41^c$ comprise simple angle-pieces adapted to the sides of the frame, while the reinforce $41^d$ is an angle-brace fitting the angle and having a strengthening-web.

Some forms of teeth or shovels are illustrated in Figs. 24, 25, and 26. The forms shown in Figs. 24 and 26 involve no new essential features; but the form shown in Fig. 25 embodies several novel features whereby a spring-tooth is made applicable to a metallic gang-frame in a very simple manner and is adjustable thereon at will.

If desired, the gang-frame may be formed as shown in Fig. 18 and the rim bent to form offsets 50, which, together with the clips 51, provide clamps to hold the shanks of vertical shovels or to hold the sockets in which said shanks are fitted. These offsets are in such shape that the diagonals are arranged from front to rear in order to permit the diagonal arrangement of shanks as claimed in another application. The form of gang-frame shown in Fig. 18 is thoroughly adapted to receive and carry spring-teeth, as shown in Fig. 25. I may also employ the form of gang-frame shown in Fig. 20, the border 41 of which is shaped to form tapering sides with offsets adapted to form seats for the attachment of intermediate longitudinal bars $41^b$, that with the front and rear portions of said border constitute a central well or opening adapted to have a wheel travel therein, while intermediate transverse bars $44^a$ are secured to the border 41 and to longitudinal bars $41^b$. Although this form of gang-frame is shown with integrally-formed sockets at front and rear, it is obvious that either or both may be dispensed with when desirable. This form of gang-frame is adapted to have soil-stirring parts attached to all portions of its borders and bars, as indicated, by numerous perforations provided for that purpose.

By the use of the removable, shiftable, or interchangeable bars and numerous perforations in the borders and other members of the gang-frames and by locating the clamps securing soil-stirring parts on one side or the other of the borders and bars of the gang-frames I am enabled to obtain a very great degree of adjustability and many different modifications in the placing of the soil-stirring devices.

Having thus described my invention, the following is what I claim as new therein and desire to secure by Letters Patent:

1. In an implement of substantially the character described, the combination of the gang-frames, the wheels running in the gang-frames, the frame mounted on the wheels and having the transverse draw-head, sleeves confined on the draw-head but adapted to turn thereon, stirrups clamped to the sleeves and draw-bars projecting from the gang-frames and having laterally-swinging connection with the stirrups, substantially as herein described.

2. In an agricultural implement, the combination of a suitable frame, arch carrying wheels on its downwardly-extending ends, a draw-head secured beneath the forward part of the frame, bracing-rods extending forward and upward from the lower parts of the arch and the socket-clamps receiving the ends of the brace-rods and adjustably fixed on the lower parts of the arch and upon the draw-head, substantially as explained.

3. In an agricultural implement, the combination of the divided arch carrying wheels, the frame supported on the arch, the draw-head carried by the frame, sleeves mounted rotatively on the draw-head, gang-frames having connection secured upon the sleeves, collars for confining the sleeves longitudinally, and braces extending from the lower parts of the arch and entering sockets formed in the confining-collars of the draw-head, substantially as explained.

4. In an agricultural implement, the combination of the gang-frames having central openings, and suitable frame by which the gang-frames are drawn and on which they are adjustable, and the divided adjustable arch secured beneath said frame and having downwardly-projecting ends entering the openings in the gang-frame-carrying wheels, substantially as explained.

5. In an agricultural implement, the combination of a main frame mounted on wheels, a gang-frame drawn by the main frame, a seat, a gang-frame-elevating mechanism mounted on the main frame on the opposite side of the wheels from the seat, whereby the weight of the rider balances the weight of the gang-frame when lifted; the connection of the elevating means with the main frame, being adjustable horizontally to adapt it to balance different riders, as explained.

6. In an agricultural implement, the combination of a main frame, wheels upon which said main frame is mounted, a gang-frame drawn by the main frame, a seat mounted on the rear of the main frame, an elevating mechanism including a pulley and a flexible connection attached to the gang-frame and passing from said pulley; said pulley being on the main frame in front of the wheel-axle and being adjustable from front to rear on said main frame in order to balance the implement under different conditions, as explained.

7. In an agricultural implement, the combination of the main frame, wheels upon which the main frame is mounted, a gang-frame drawn by said main frame, a seat mounted upon the main frame, in rear of the wheel-axle, and an elevating device mounted on the main frame in front of the wheel-axle and comprising a flexible connection with the gang-frame, a pulley over which said flexible connection passes, a bar on which the pulley is longitudinally adjustable and which is laterally adjustable on the main frame, and means for taking up the flexible connection, substantially as explained.

8. In an agricultural implement, the combination of the soil-stirring devices, an elevating device and a frame upon which the soil-stirring devices are movable laterally for the purposes explained and upon which said elevating device is also movable laterally in order to have its position changed to correspond with the soil-stirring devices, substantially as explained.

9. In an agricultural implement, the combination of gang-frames, a main frame mounted on wheels and having laterally-adjustable draft connection with the gang-frames, elevating mechanism and a longitudinal bar on which the elevating mechanism is mounted and which bar is secured laterally adjustable upon the frame of the implement, substantially as shown and described.

10. In a cultivator, the combination of a pair of gang-frames each extending from an outer to a middle row, and having openings formed by the disposition of the borders and intermediate longitudinal bars of said frames, wheels traveling in said openings, a main frame mounted above wheels, a draw-head secured to the main frame, an arch-bar, an arch, suitable means for securing the arch beneath the arch-bar, stirrups clamped upon the draw-head adjustably and providing pivoted connection between gang-frames and the draw-head in a manner permitting the vertical elevation and lateral swinging of the gang-frames, substantially as and for the purposes set forth.

11. In an agricultural implement, the combination of a main frame, an arch-bar secured below the main frame, a divided arch secured below the arch-bar, wheels mounted on the depending arms of said arch, twin collars adjustably securing the respective parts of the divided arch to the arch-bar, and a draw-head comprising a transverse bar, a pair of sleeves rotatively mounted on said transverse bar, and collars confining the sleeves adjustably thereon, substantially as and for the purposes set forth.

12. In a cultivator, the combination of a main frame, a divided arch having its respective parts secured to the main frame by suitable means, wheels mounted on axles projecting from the lower ends of the depending arms of the arch, and braces extending from the lower parts of said depending arms to adjustable connections with a draw-head, substantially as and for the purposes set forth.

13. In a cultivator, the combination of a main frame suitably mounted on a wheeled support, a gang-frame carrying suitable soil-stirring parts and having adjustable draft connection with said main frame, a lever having connection with the gang-frame, an elevating mechanism that is adjustable both longitudinally and laterally, and a draw-head upon which the gang-frame, and attached soil-stirring parts, are adjustable laterally, substantially as and for the purposes set forth.

14. In an agricultural implement, a soil-stirring tooth comprising a curved flat metal body portion twisted into a plane at right angles to its upper portion, of which upper portion, a section is enlarged and provided with a transverse slot, and with a perforation near its upper end, by which said tooth is adapted to be secured to a suitable member of the implement in a manner permitting its vertical shifting and adjustment, substantially as and for the purposes set forth.

15. As a means for attaching parts in an agricultural implement, a twin collar formed with two integral split sockets each provided with an independent clamping means, substantially as herein described.

16. As a means for attaching the parts of an agricultural implement, the twin collar substantially as herein shown, comprising two split rings suitably spaced apart in parallel relation by an integral web, and each having projecting lips with clamping-screws adapting each to be independently clamped on the part which it surrounds, substantially as set forth.

17. In an agricultural implement, a draw-head adapted to provide draft connection for gang-frames for soil-stirring devices, and means permitting lateral adjustment and vertical movement on said draw-head, comprising a transverse bar extending across the main frame, sleeves rotatably mounted on said transverse bar and adjustable longitudinally thereon, and clamping-collars employed to confine said sleeves adjustably upon said transverse bar, substantially as and for the purposes set forth.

18. In a cultivator, an elevating mechanism adapted to provide for vertical movement and lateral swinging of a gang-frame, and which is adjustable longitudinally, substantially as and for the purposes set forth.

19. In a cultivator, the combination of a main frame, a draw-head carried by said main frame, gang-frames having laterally-adjustable connections with said draw-head, and an elevating mechanism mounted on the main frame and constructed for lateral adjustment corresponding with the gang-frames, substantially as explained.

20. In a cultivator, an elevating mechanism adapted to be adjusted in correspondence with adjustments of a stirrup adapted to provide pivoted connection between a gang-frame and the draw-head, and of the divided arch relatively to the arch-bar, substantially as and for the purposes set forth.

21. In a cultivator, the combination of a pair of gang-frames, an arch-bar, a divided arch, and an elevating mechanism adapted to be adjusted both laterally and longitudinally, substantially as and for the purposes set forth.

22. In a cultivator, the combination of a main frame, an arch-bar, a divided arch laterally adjustable on said arch-bar, gang-frames drawn by said main frame and laterally adjustable thereon, and an elevating mechanism mounted on the main frame, and adjustable both laterally and longitudinally thereon, substantially as and for the purposes set forth.

23. In a cultivator, the combination of a main frame, a divided arch adjustably secured beneath said main frame and affording support for wheels upon which the main frame travels, gang-frames drawn by the main frame, elevating mechanism mounted on the main frame and connected with the gang-frames and braces extending from suitable points on the main frame to the depending arms of the divided arch and having pivotal and adjustable connections with said parts, substantially as and for the purposes set forth.

24. In a cultivator, the combination of a main frame, a divided arch adjustably secured beneath the main frame, and affording mountings for wheels upon which the main frame travels, a draw-head also secured to the main frame, gang-frames, draw-bars projecting from said gang-frames and having laterally-adjustable connections with the draw-head, and braces extending from the draw-head to the depending arms of the divided arch, and having laterally-adjustable connection with said draw-head whereby the braces may be moved as the divided arch is adjusted, substantially as set forth.

25. In a cultivator, the combination of a main frame suitably mounted over wheels, a pair of gang-frames each having its border and bars disposed in a manner to form a well or opening in the longitudinal center thereof for wheels to travel in, a pair of wheels suitably mounted on axles projecting from the depending arms of an arch, a draw-head adapted to provide adjustable draft connection between the gang-frames and the main frame, and an elevating mechanism adapted to be adjusted laterally to conform to the adjustment of gang-frames relatively to the main frame, substantially as and for the purposes set forth.

26. In a cultivator, the combination of a main frame, a divided arch secured to said main frame and having wheels mounted on its depending arms, a draw-head on said main frame, clamping socket-collars adjustably mounted on the depending arms of the arch and upon the draw-head, and braces having pivoted and adjustable connections with said depending arms of the divided arch and draw-head through the medium of said clamping socket-collars, substantially as and for the purposes set forth.

27. In a gang-frame for an agricultural implement, the combination of a border, intermediate bars, a wheel-opening and a front socket adapted to receive a soil-stirring part, substantially as and for the purposes set forth.

28. In a gang-frame for an agricultural implement, the combination of a substantially continuous border, intermediate bars, a wheel-opening formed by the disposition of said border and bars, and sockets at both front and rear adapted to receive soil-stirring parts, substantially as and for the purposes set forth.

29. In a gang-frame for an agricultural implement, the combination of a border forming converging sides, intermediate bars, a wheel-opening, and a rear socket adapted to receive a soil-stirring part, substantially as and for the purposes set forth.

30. In a cultivator, a gang-frame having a border shaped to form sides tapering to one end from centrally-disposed straight longitudinal sections, with other longitudinal sections interposed in the said tapering portions of said frame, which are adapted to form seats to receive soil-stirring parts, and sockets formed at the ends of said frame, substantially as and for the purposes set forth.

31. In a cultivator, a gang-frame comprising a substantially continuous border with offsets therein adapted to provide seats for soil-stirring parts, and having clamps for securing the soil-stirring parts in said seats, substantially as shown and for the purpose set forth and described.

32. In a cultivator, the combination of gang-frames, a main frame mounted on a pair of wheels disposed in openings centrally formed in the gang-frames by the disposition of the border and intermediate bars comprised in said frames, draw-bars projecting from the gang-frames, and a draw-head mounted on the main frame and comprising a non-rotating transverse bar and rotating sleeves surrounding the transverse bar, and to which the draw-bars are connected, and clamping-collars confining the sleeves adjustably upon said transverse bar, substantially as and for the purpose set forth.

33. In a cultivator adapted to the simultaneous tillage of two entire row-spaces, the combination of an elevating mechanism adjustable laterally and longitudinally, a pair of wheels, suitable soil-stirring parts, gang-frames, and a draw-head, all of which parts are severally adjustable in correspondence one with another, substantially as and for the purposes set forth.

CHARLES WOOD DAVIS.

Witnesses:
HUGH M. STERLING,
HERVEY S. KNIGHT.